July 21, 1936.  A. N. SPÁNEL ET AL  2,048,360
METHOD AND APPARATUS FOR MAKING HELICALLY WOUND TUBES
Filed March 2, 1934  2 Sheets-Sheet 1

INVENTORS
A. N. SPÁNEL
W. C. HENRY
by D. Clyde Jones
ATTORNEY

July 21, 1936.  A. N. SPÁNEL ET AL  2,048,360
METHOD AND APPARATUS FOR MAKING HELICALLY WOUND TUBES
Filed March 2, 1934  2 Sheets-Sheet 2

INVENTORS
A. N. SPÁNEL
W. C. HENRY
by D. Clyde Jones
ATTORNEY

Patented July 21, 1936

2,048,360

UNITED STATES PATENT OFFICE 2,048,360

METHOD AND APPARATUS FOR MAKING HELICALLY WOUND TUBES

Abraham N. Spánel and William C. Henry, Rochester, N. Y.; said Henry assignor to said Spánel Application March 2, 1934, Serial No. 713,768

9 Claims. (Cl. 18—51)

This invention relates to the method of and to apparatus for making tubing from one or more strips of material.

The main feature of the invention resides in the novel method for making helically wound continuous tubing which will be free from wrinkles, which will have a substantial degree of rigidity and in which the joints between the several layers of material are sealed together. With this method it is even possible from a single strip to wind a sealed tubular structure formed with overlapping layers, thereby affording much simpler manufacturing operations than the method of butt winding now used in the art which requires two or more strips of material in the winding operation in order to secure the desired rigidity. Although the tube is herein disclosed as formed from a single strip of material, it is possible to wind the tubing by the present method from two or more strips of material if it is so desired.

Another feature of this invention relates to a commercial method for successfully winding tubing from a single strip of regenerated cellulose or cellulose acetate and the like, so that the wound product possesses a degree of rigidity suited to the use to which the product is to be subjected.

An additional feature of the invention relates to a commercial method of winding tubes having a fineness of bore that has not been hitherto successfully attained by the usual methods employed in the art.

A further feature of the invention relates to apparatus by which the present method can be put into practice.

Still another feature of the invention relates to a winding machine having a mandrel which is either directly or indirectly heated.

Figure 1:
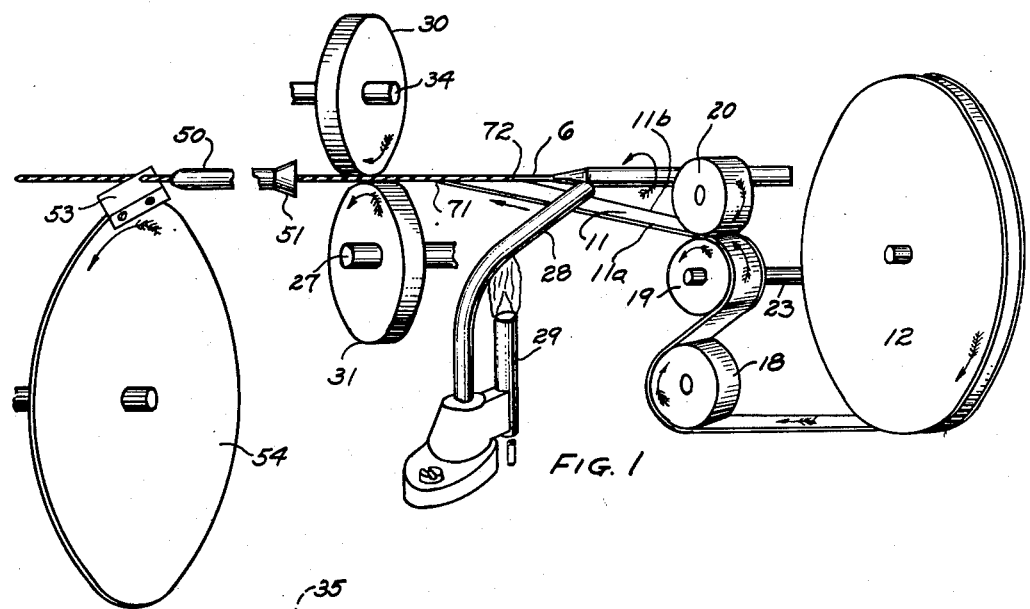
Figures 4, 5, 8, 9:
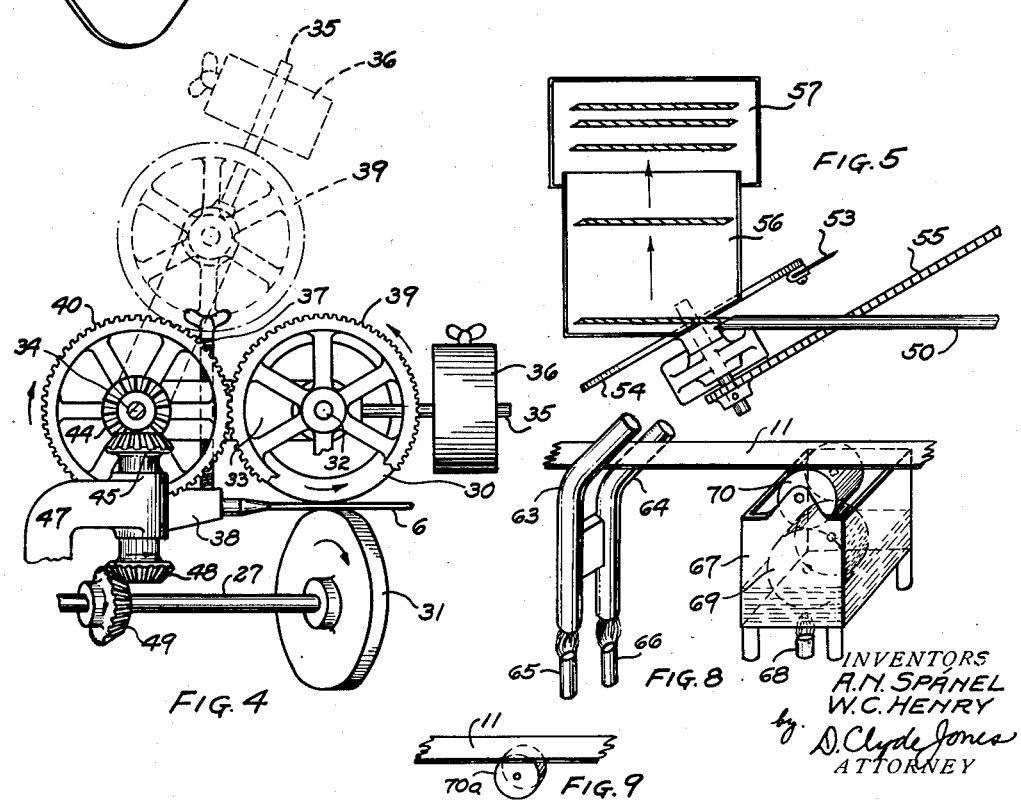
Figures 2, 6:
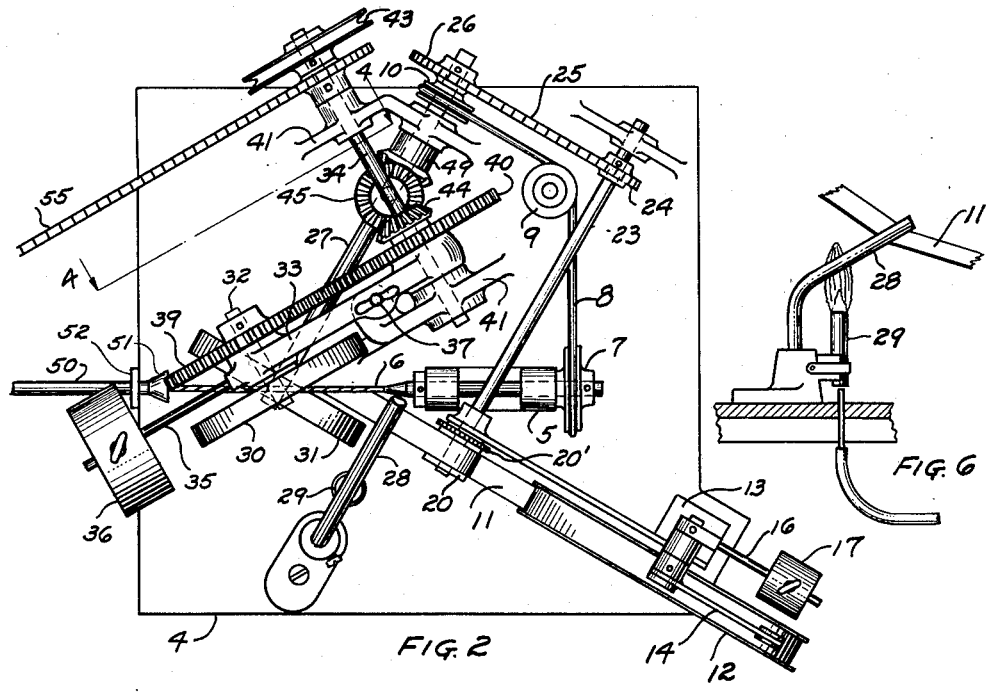
Figure 3:
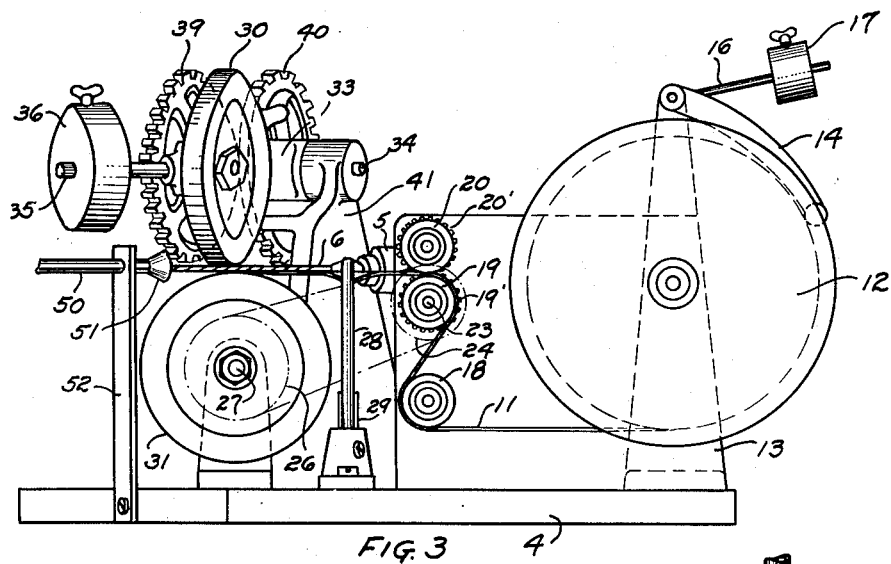
Figures 7, 10:
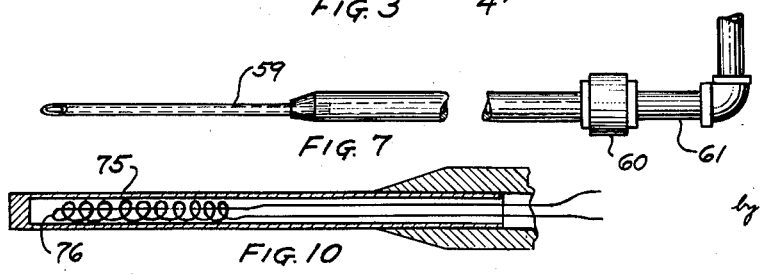

These and other features of the invention will appear from the detailed description and claims when taken with the drawings in which Fig. 1 is a diagrammatic disclosure useful in describing the method of the present invention and showing the principal elements of the machine in perspective; Fig. 2 is a plan view of the machine for making continuous tubing but in which the means for cutting the tubing into equal lengths has been omitted; Fig. 3 is a side elevation of the apparatus shown in Fig. 1; Fig. 4 is a vertical sectional view taken on the line 4—4 of Fig. 2 looking in the direction of the arrows; Fig. 5 is a plan view of the means for cutting the tubing into equal lengths, the relation of which means with respect to the remainder of the apparatus will be understood by comparison with the plan view of Fig. 2; Fig. 6 is a detailed view of the means for heating the strip of material prior to its being wound; Fig. 7 shows a hollow mandrel which may be substituted for the solid mandrel shown in Fig. 1; Fig. 8 is a perspective view of an arrangement whereby the strip of material may be coated with a thermoplastic substance and also shows a modified form of heater for heating the strip; Fig. 9 is a detailed view of a slightly different form of applicator for applying the thermoplastic substance to a small portion only of the width of the strip; and Fig. 10 is an enlarged sectional view of a modified form of mandrel which has enclosed therein a heating element.

While the present invention is applicable to the making of continuous tubing from various kinds of strip material, it is particularly adapted for the making of such continuous tubing from a strip or strips of regenerated cellulose, either in its plain form or when coated with a thermoplastic substance to render it self-sealing. The invention may also be used for the making of continuous tubing from cellulose acetate, cellulose nitrate and related materials.

Referring to the drawings, 4 designates a base having a bracket 5 in which the enlarged bearing portion of a mandrel 6 is rotatably mounted. The mandrel at its enlarged end has attached thereto a pulley 7 which is driven by a belt 8 passing around idler pulleys 9 (one of these pulleys only being visible in Fig. 2) and engaging the driving pulley 10 mounted on the shaft 27. A thermoplastically coated strip 11 of the material to be wound is supplied from a roll, herein illustrated as carried on a reel 12, which is rotatably supported on an upright 13 extending from the base. The free end of this upright has pivotally mounted thereon, an arm 14 terminating in a bearing surface to engage the surface of the roll of strip material on the reel 12 in order to retard the unwinding of the strip therefrom. The arm 14 through its pivot has attached thereto a rod 16 on which there is adjustably mounted a weight 17 whereby the braking action of this arm on the movement of the reel may be varied at will. The strip 11 as it leaves the reel passes around an idler roll 18 which serves to direct the strip always at the same definite angle to the driven feed rolls 19 and 20. The surface of these feed rolls is covered with a layer of rubber or other similar material to grip the strip and to feed it at a uniform rate to the mandrel 6. The feed roll 19 is mounted on a shaft 23 which carries a spur gear 19' to mesh with and to drive a similar spur gear 20' mounted on the stub shaft of the feed roll 20. The shaft 23 has attached thereto a sprocket wheel 24 driven by a chain 25 engaging a similar sprocket 26 on the driving shaft 27.

The strip of material after leaving the feed rolls, moves into engagement with the underside of a bent rod 28 which is heated in any suitable manner such as by a Bunsen burner 29 functioning to heat and soften the strip and to melt the coating thereon. The strip after being thus heated is fed at an acute angle to the reduced portion of the mandrel 6. Near the free end of the mandrel there are provided two driven winding rolls 30 and 31 having surfaces of relatively soft rubber or other similar material which is sufficiently resilient to conform to the shape of the mandrel. These winding rolls which have a greater peripheral speed than the peripheral speed of the feed rolls 19 and 20, are mounted for rotation in the direction shown in Figs. 1 and 4, having their principal planes arranged with respect to the axis of the mandrel at angles determined by the desired pitch of the overlapping layers of the strip. It will be noted that the main plane of the lower winding roll 31 is parallel to the main planes of the feed rolls 19 and 20. The upper winding roll 30 is mounted on a stub shaft 32 journaled in a bracket 33, which bracket is arranged to rotate on the shaft 34 for limited swinging movement as indicated in dotted lines in Fig. 4 in order to facilitate threading the strip onto the mandrel at the time of starting the machine. This bracket at its free end is provided with a rod 35 on which there is adjustably mounted a weight 36 to insure that the bracket will remain in its lower position to exert the necessary pressure of the winding rolls on the strip wound on the mandrel. The limit of this lower position is determined by a set screw 37 which engages the upper surface of an extension 38 carried by the base, thereby affording regulating means for the pressure desired.

The stub shaft 32 at its other end has attached thereto a gear 39 which in turn meshes with a gear 40 mounted on the shaft 34. The shaft 34 is journaled on suitable brackets 41 extending upwardly from the base and is driven by a pulley 43 to which the primary source of power is applied. The shaft 34 also has secured thereto a bevelled gear 44 which meshes with a second bevelled gear 45 attached to the upper end of a vertical stub shaft suitably mounted for rotation in bracket 47 (Fig. 4) extending upwardly from the base. The lower end of this stub shaft is likewise provided with a bevelled gear 48 meshing with the bevelled gear 49 attached to the horizontal shaft 27. This shaft drives the lower winding roll 31.

A hollow guide 50 provided with an open bell end 51 is supported in axial alinement with the mandrel 6 so that the wound product or tube feeds into this guide. The length of this guide is sufficient to support the tube while it is cooling. For convenience in threading the wound product or tube into this guide, its end adjacent the mandrel is mounted on an upright 52 which at its lower end is attached to the base by a screw in such a manner that there is sufficient friction to hold the upright in its normal position. However, this frictional mounting permits the guide to be swung out of alinement with the mandrel when it is desired to adjust or to rethread the machine.

The product or tube after being fed through this guide is preferably cut off on the bias by a rotating blade 53. As herein shown this blade is mounted on the periphery of a relatively large rotating disk 54 which is driven by chain 55 from the shaft 34 although it will be understood that the blade may be mounted on a rotating arm arranged to engage the wound tube intermittently at proper intervals to cut it off into desired lengths. It should be understood that this blade rotates at such a speed and at such an angle to the direction of motion of the product, that it will make a clean cut end for each tube length. There is mounted adjacent the cutter, an inclined tray 56 which receives the cut off lengths of the product and permits them to roll by gravity into a receptacle 57.

The method of this invention and the operation of the apparatus for putting it into effect, will best be understood by reference to Fig. 1 when taken with the drawings of Figs. 2, 3 and 4. The strip 11 of material is fed from the reel 12, its movement being restrained by the brake 14 to prevent undesired unwinding of the material. After leaving the reel the strip passes about the direction roll 18, which guides the strip at a uniform angle to the feed rolls 19 and 20. These feed rolls are driven in the direction indicated by the arrows to advance the strip at a uniform rate to the rotating mandrel 6. In passing to the mandrel the strip encounters the undersurface of the heated element 28 which serves to melt the fusible adhesive coating on the strip and to soften the material of the strip.

It will be understood that the heating and softening of the strip causes it to lie smoothly on the mandrel which is maintained hot during the winding operation by contact with this heated strip. The strip is wound in smooth helical layers on the mandrel since the heat permits the strip to stretch as tension is applied thereto by the winding rolls 30 and 31. The mandrel rotates in the direction indicated so that it tends to unwind the strip slightly therefrom and in this way the strip is broken away from the mandrel even though its fused coating would tend to make the strip adhere thereto. The winding rolls 30 and 31 rotate in the direction indicated by the arrows and serve to wind the strip at the desired pitch on the mandrel and to rotate and advance the wound product or tube axially from the mandrel. It will be seen that the difference in the peripheral speed of the winding rolls 30 and 31, which is greater than the peripheral speed of the feed rolls 19 and 20, produces a tension on the softened strip 11. It will also be seen that when the heated and softened strip is wound on the mandrel 6 there is more tension upon and stretch of the edge 11a than there is tension upon and stretch of the edge 11b because the edge 11a winds upon several previously wound layers of the strip material as indicated at 71, whereas edge 11b is winding on the mandrel itself notated at 72 so that actually the heated and softened strip is winding on a mandrel of relatively greater diameter at 71 than it is at the point 72. It is this relatively greater stretch of the heated and softened strip at the edge 11a as compared to the stretch upon the edge 11b which allows the strip to pull down tightly in the winding process in a manner to produce tubing free from wrinkling. After passing from the winding rolls, as a sealed product, the tubular structure passes through the guide 50 which is of such length that the heated coating on the strip is further cooled. As the tube emerges from the end of the guide, it is intermittently engaged by the rotating blade to cut the tube on the bias.

In certain instances, it is desirable to fill the hollow product or tube in order to give it greater rigidity and for this purpose, a hollow rotating mandrel 59 is provided through which a quick-cooling filling medium such as paraffin from a heated source fills the hollow tube. When such a hollow mandrel is provided a coupling 60 is necessary in order to connect the rotating mandrel to the stationary supply pipe 61.

In Fig. 8 there is illustrated a modified arrangement for heating the strip material wherein two heating elements 63 and 64, heated by the Bunsen burners 65 and 66, contact with the upper and the lower surfaces of the strip 11. In this arrangement provision is also made for coating one surface of the strip with thermoplastic material such as cement. This cement is held in a receptacle 67 which is heated by the burner 68. A constantly rotating feed roll 69 dips into the heated cement to apply it as a thin layer on the applicator roll 70 which applies the thin layer of cement carried thereby to the under surface of the strip. Obviously with a slight modification a thin layer of cement can be applied to the upper surface of the strip if desired.

In Fig. 8 the applicator roll 70 is shown as having a width sufficient to apply cement to the entire under-surface of the strip. However, in Fig. 9 the applicator roll 70a, which may be substituted for roll 70, is considerably narrower than the width of the strip so that only a narrow band of adhesive is applied to the underside of the strip.

By the arrangements disclosed in Figs. 8 and 9, it is possible to wind tubing from a strip of regenerated cellulose or cellulose acetate with the aid of a thinly spread layer of thermoplastic cement on the strip for the purpose of securing special sealing properties or for the purpose of giving added rigidity to the tubular structure. This layer of cement may be applied to the strip before it passes over the heating elements such as 28, or 63 and 64, or as it is passing over the heating element, or it may be applied to the strip at a point thereon between the heating element and the mandrel. In either case, it is essential that the mandrel itself be sufficiently hot to make possible easy winding.

While the heated strip normally transfers sufficient heat to the mandrel to maintain it hot, there is shown in Fig. 10, a directly heated hollow mandrel 75 having therein an electric heating element 75 which maintains the mandrel at any desired temperature.

While several embodiments of the invention have been disclosed, it will be understood that this invention is capable of still further modifications and that this disclosure is intended to cover any variations, uses or adaptions of the invention falling within the scope of the appended claims.

What we claim is:

1. In a winding machine, a heated mandrel, means for supplying a strip to said mandrel, and cushioned winding rolls for gripping and winding the strip on the mandrel, said rolls having a peripheral speed greater than that at which said strip is supplied to said mandrel.

2. In a winding machine, a hot rotating mandrel, means for supplying a strip to said mandrel, cushioned winding rolls for gripping and winding the strip on the mandrel, said rolls having a peripheral speed greater than that at which said strip is supplied to said mandrel.

3. In a winding machine, a hot mandrel, feed rolls for supplying a strip to said mandrel at a uniform speed and at an acute angle to the principal axis of the mandrel, cushioned winding rolls in position to engage a strip on the mandrel, said winding rolls being rotatable on axes inclined to the principal axis of the mandrel, and means for rotating said winding rolls.

4. In a winding machine, a heated rotatable mandrel, feed rolls for supplying a strip to said mandrel at a uniform speed and at an acute angle to the principal axis of the mandrel, cushioned winding rolls in a position to engage a strip on the mandrel, said winding rolls being rotatable on axes inclined to the principal axis of the mandrel, and means for rotating said mandrel, said winding rolls and said feed rolls.

5. The method of making tubing from at least one very thin strip having a thermoplastic surface which comprises heating said strip to soften said surface and winding said strip helically upon itself into tubular form on a rotating mandrel while said surface is still soft, said mandrel being rotated in a direction tending to unwind the strip therefrom.

6. The method of making tubing from at least one very thin strip of material having a thermoplastic surface which comprises heating said strip and helically winding it in overlapping layers while still warm, on a mandrel rotating in a direction tending to unwind the strip from said mandrel.

7. The method of making tubing from a strip of regenerated cellulosic material having a thermoplastic surface which comprises heating and stretching the edges of said strip unequally while winding it helically on a mandrel.

8. The method of making tubing from a thin strip of regenerated cellulosic material having a thermoplastic surface which comprises heating and stretching the edges of said strip unequally and winding it helically in overlapping layers upon a mandrel.

9. The method of making tubing from a thin strip of regenerated cellulosic material having a thermoplastic surface which comprises passing said strip over a heated surface, stretching the edges of said strips unequally and winding it helically on a mandrel.

ABRAHAM N. SPÁNEL.
WILLIAM C. HENRY.